(12) United States Patent
Munz

(10) Patent No.: US 9,885,162 B1
(45) Date of Patent: Feb. 6, 2018

(54) DOUBLE-WALL FLOOD BARRIER

(71) Applicant: Heinz Munz, Jackson, WY (US)

(72) Inventor: Heinz Munz, Jackson, WY (US)

(73) Assignee: Heinz Munz, Jackson, WY (US)

( * ) Notice: Subject to any disclaimer, the term of this patent is extended or adjusted under 35 U.S.C. 154(b) by 0 days.

(21) Appl. No.: 15/267,681

(22) Filed: Sep. 16, 2016

(51) Int. Cl.
*E02B 3/10* (2006.01)
(52) U.S. Cl.
CPC .................................. *E02B 3/106* (2013.01)
(58) Field of Classification Search
CPC ....................................................... E02B 3/106
See application file for complete search history.

(56) References Cited

U.S. PATENT DOCUMENTS

| | | | | |
|---|---|---|---|---|
| 1,079,113 | A | * | 11/1913 | Conzelman ............... E04B 2/56 256/19 |
| 5,984,576 | A | * | 11/1999 | Zetzsch .................. E02B 3/106 405/107 |
| 6,042,301 | A | * | 3/2000 | Sovran ..................... E02B 7/22 256/19 |
| 7,690,167 | B2 | * | 4/2010 | Antonic ................... E04B 1/28 52/296 |

FOREIGN PATENT DOCUMENTS

EP 2060680 A1 * 5/2009 ............ E02B 3/106

* cited by examiner

*Primary Examiner* — Tara Mayo-Pinnock
(74) *Attorney, Agent, or Firm* — Dickinson Wright PLLC

(57) ABSTRACT

A double-wall flood barrier to hold back water from either of two opposite sides is provided and includes a first flood wall to hold back water from a first wet side and a second, identical, flood wall parallel and adjacent to the first flood wall with a mirror-image orientation to hold back water from a second wet side. Each flood wall includes a post defining a pair of vertical troughs and a plurality of stop logs stacked horizontally and extending from a trough of a post to a trough of another post or to a channel in an end wall. Each post is removably secured to an anchor plate inset in the floor. A brace may extend outwardly and downwardly from the post to provide support against lateral forces caused by flood water. An anchor link may interconnect adjacent posts of the first flood wall and the second flood wall.

5 Claims, 7 Drawing Sheets

DOUBLE-WALL FLOOD BARRIER

BACKGROUND

Flood barriers are commonly used to hold back flood water. Flood barriers may be permanent, such as earthen dams or levees, or they may be removable, such as sand bags, or engineered barriers with components specially designed for holding back water. Removable flood barriers are sometimes used in areas subject to flooding at times or in response to expected flooding, but where a permanent barrier is not necessary or where a permanent barrier is not desirable because of reasons that include cost, impedances to traffic, aesthetics, etc. A known type of removable flood barrier is a single-wall flood barrier using posts and stop logs, which can be quickly and easily erected upon anchors that are pre-set in a floor, road, sidewalk, or other grade-level site. Such single-wall flood barriers are generally constructed to hold back flood water from one side, commonly called the "wet side", and to transfer lateral loads created by the flood water to braces that extend downwardly and outwardly, away from the wet side. In this way, single-wall flood barriers hold back flood water to maintain a dry side opposite the wet side.

There exists a need for a removable flood barrier that can hold back flood water from either of two opposite sides. In other words, a barrier that can maintain either of two opposite sides as a dry side if the other side is inundated with flood water has clear advantages over known single-wall flood barriers that can only hold back water from one side. Such a two-sided barrier may be used in applications such as shopping centers where the owners of individual properties in a larger development have partnered with the overall flood protection plan for the development, but where each owner may wish to segment their own property such that they would be protected, even if flood protection barriers for other portions of the development were breached or not properly erected. By using barriers that can maintain either of two opposite sides as a dry side, each individual property owner may compartmentalize the flood protection of their property.

SUMMARY

This section provides a general summary of the disclosure and is not a comprehensive disclosure of its full scope or all of its features, aspects or objectives.

A double-wall flood barrier is provided to hold back flood water from either of two opposite sides. The double-wall flood barrier comprises a first flood wall including an anchor plate inset in the floor, and a post having a beam portion defining a trough that extends vertically from a lower edge with a base plate attached thereto. A plurality of stop logs may be stacked upon one another and each partially disposed within the trough to seal against flood water from the first wet side. A second flood wall is disposed parallel and adjacent and is arranged in a mirror-image orientation to the first flood wall to hold back water from the second wet side opposite the first wet side.

A brace may attach to the post to further support the post against lateral forces from flood water. An anchor link may interconnect adjacent ones of the posts between the first flood wall and the second wall to transfer lateral loads from one of the posts to the other adjacent one of the posts. Such transferred lateral loads may be further transferred to the floor through a brace attached to the other adjacent one of the posts.

Adjacent ones of the posts of the first flood wall and the second flood wall may be removably secured to the same anchor plate or to different anchor plates.

BRIEF DESCRIPTION OF THE DRAWINGS

The drawings described herein are for illustrative purposes only of selected embodiments and not all implementations, and are not intended to limit the present disclosure to only that actually shown. With this in mind, various features and advantages of example embodiments of the present disclosure will become apparent from the written description when considered in combination with the appended Figures, wherein.

DETAILED DESCRIPTION

Figure 1:
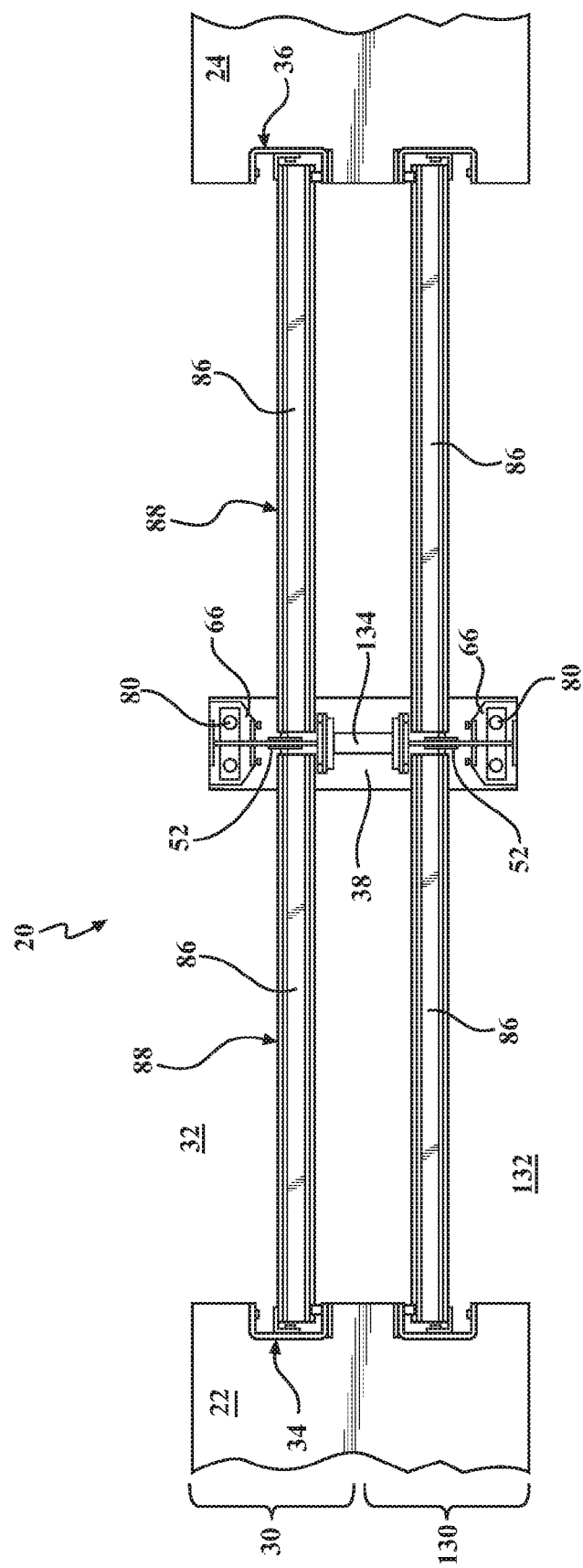
FIG. 1 is a top-view of a removable double-wall flood barrier.

Disclosed herein is a double-wall flood barrier 20 mounted on a floor 26 to hold back water from either of two opposite sides 32, 132.

Referring to the Figures, wherein like numerals indicate corresponding parts throughout the several views, a double-wall flood barrier 20 is provided. The double-wall flood barrier 20 may extend between a first jamb wall 22 and a second jamb wall 24 and on top of a floor 26 defining a flat surface 28. It should be understood that a floor 26 may include the ground or any other level of a building or other construction for pedestrian traffic or any roadway, walkway, sidewalk, or other site at, above, or below grade-level. A floor 26 may also include a curb or any other construction upon which a flood barrier 20 may be erected.

The double-wall flood barrier 20 comprises a first flood wall 30 to hold back water from a first wet side 32, and which may extend between a first C-channel 34 having a C-shaped cross-section disposed vertically in the first jamb wall 22 and a second C-channel 36 having a C-shaped cross-section disposed vertically in the second jamb wall 24.

Figure 4:
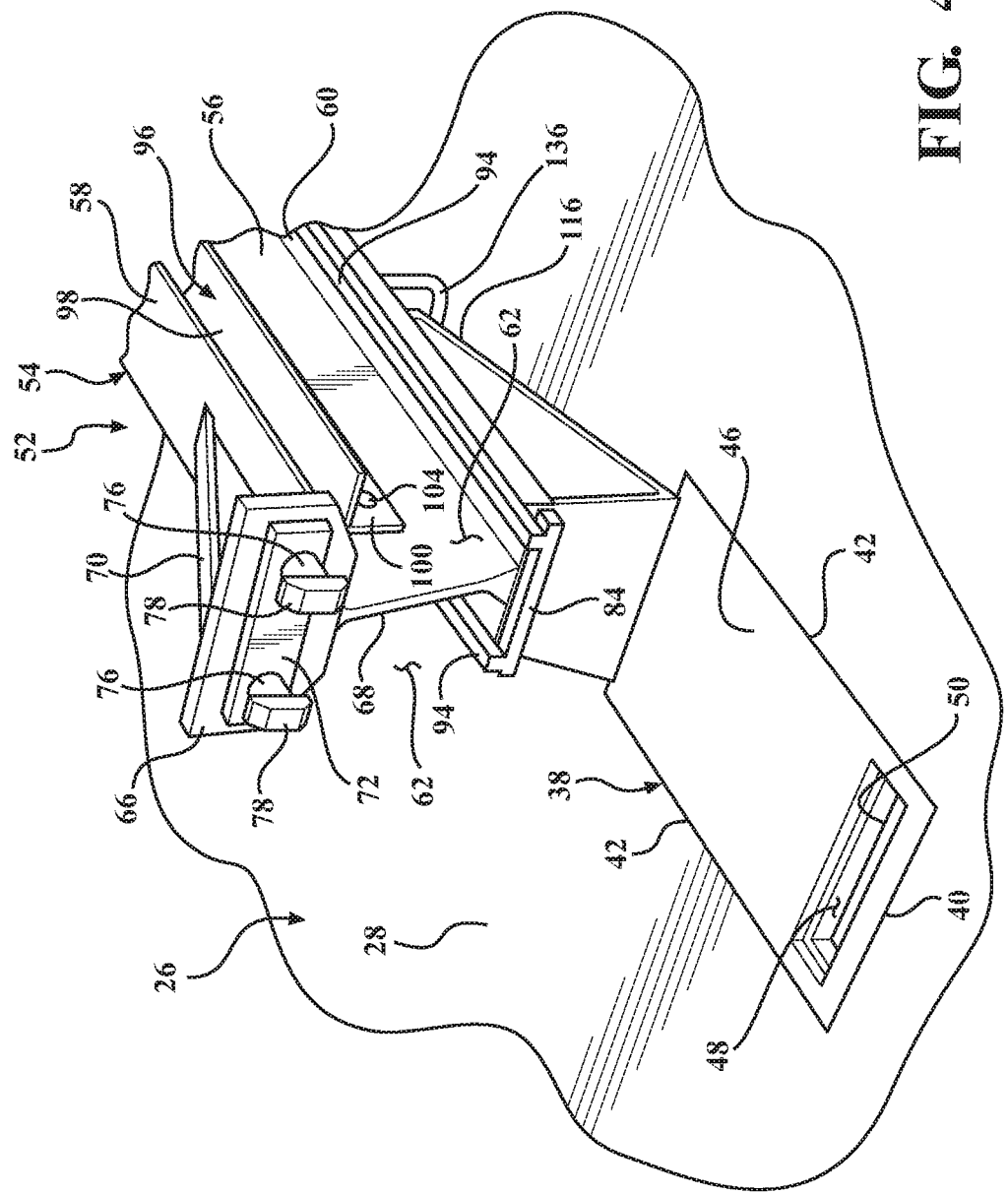
FIG. 4 is a perspective view of an anchor plate and a post detached from one another.

As best shown in FIG. 4, the first flood wall 30 includes an anchor plate 38 having a generally rectangular shape with two short edges 40 and two long edges 42 and inset in the floor 26 between the first C-channel 34 and the second C-channel 36. The anchor plate 38 further includes a bottom surface 44 (not shown) and a top surface 46 flush with the flat surface 28 of the floor 26 and defines a recess 48 of rectangular shape aligned-with and adjacent to the one of the short edges 40 on the first wet side 32. An aperture 50 of rectangular shape may be centered within the recess 48.

The first flood wall 30 may include a post 52 having a beam portion 54 with a generally I-shaped cross section with an intermediate plate 56 extending between a first vertical plate 58 adjacent the first wet side 32 and a second vertical plate 60 opposite the first wet side 32 to define a pair of troughs 62 extending vertically and opposite one another. An eyelet 64 may extend from the beam portion 54 opposite the base plate 66 to aid in lifting and positioning the post 52 upright over the anchor plate 38. The beam portion 54 may include a lower edge 68 with a base plate 66 attached perpendicularly thereto. A gusset 70 having a triangular shape may connect the base plate 66 to the first vertical plate 58 opposite the intermediate plate 56. The base plate 66 may present a protrusion 72 of rectangular shape disposed outwardly of the first vertical plate 58 and opposite the beam portion 54 to engage the recess 48 of the anchor plate 38 to locate the post 52 thereupon and to prevent lateral motion therebetween. The base plate 66 may define one or more bolt holes through the protrusion 72.

A toggle bolt 76 may extend through each of the bolt holes in the base plate 66 and include a head 78, which may have a trapezoidal profile and a rectangular cross section to pass through the aperture 50 of the anchor plate 38 in a first orientation and to engage the bottom surface 44 of the anchor plate 38 in a second orientation. A nut 80 may be secured to a threaded end 82 of the toggle bolt 76 opposite the head 78 for removably securing the post 52 to the anchor plate 38. A first gasket 84 of elastomeric material may be disposed on the lower edge 68 of the second vertical plate 60 to form a watertight seal between the post 52 and the anchor plate 38.

The first flood wall 30 includes a plurality of stop logs 86 each having a generally rectangular cross-section and stacked horizontally upon one another and each partially disposed within and extending from one of the troughs 62 to another one of the troughs 62 or one of the C-channels 34, 36 to form a wall segment 88 to seal against flood water from the first wet side 32. Each of the stop logs 86 may include a second gasket 90 of elastomeric material to form a watertight seal between adjacent ones of the stop logs 86 and between a bottom one of the stop logs 86 and the floor 26.

Figure 2:
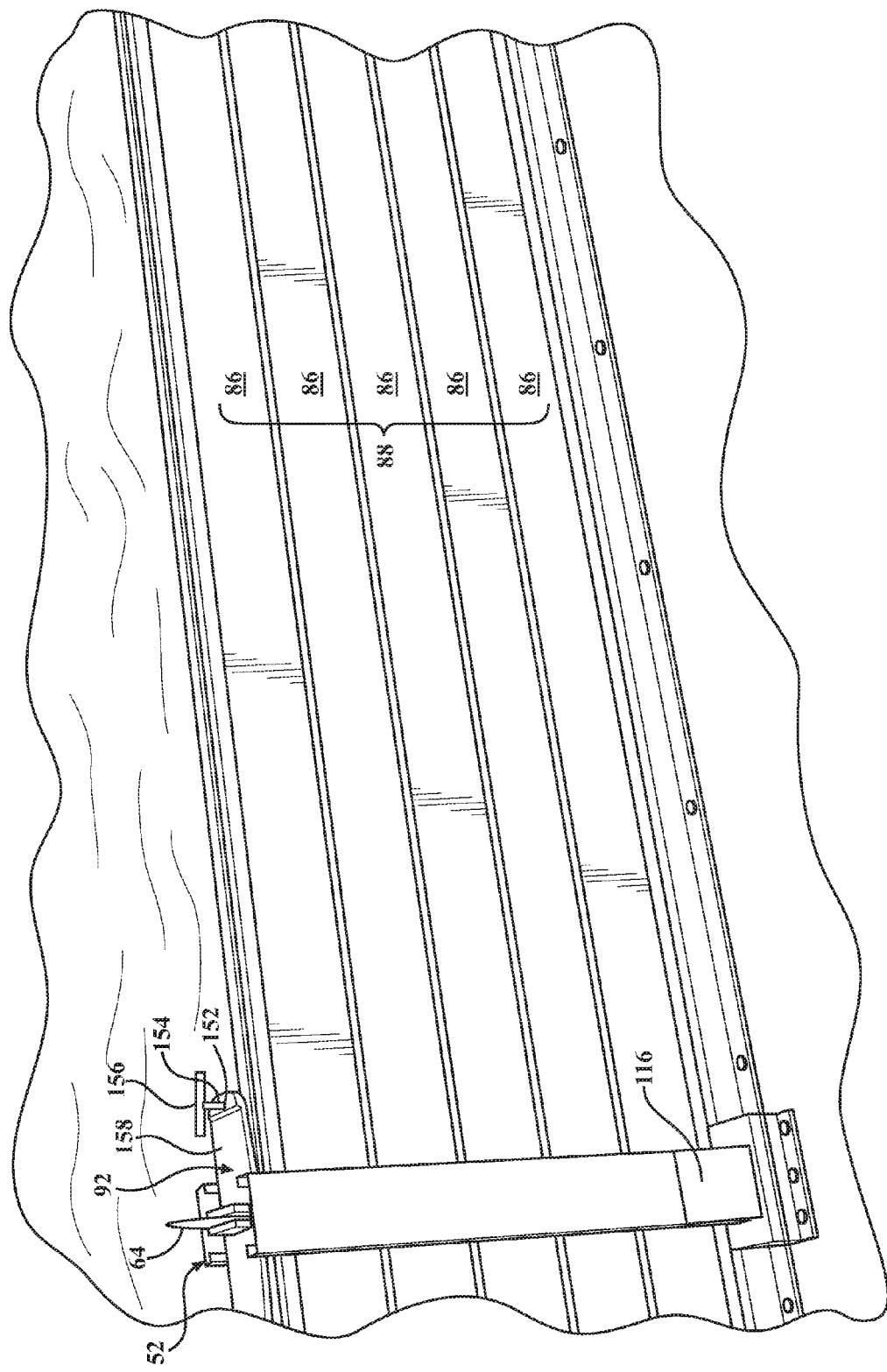
FIG. 2 is a perspective view of a removable flood barrier including a pressure plate extending horizontally from the post and in a wedging engagement with the trough.
Figure 3:
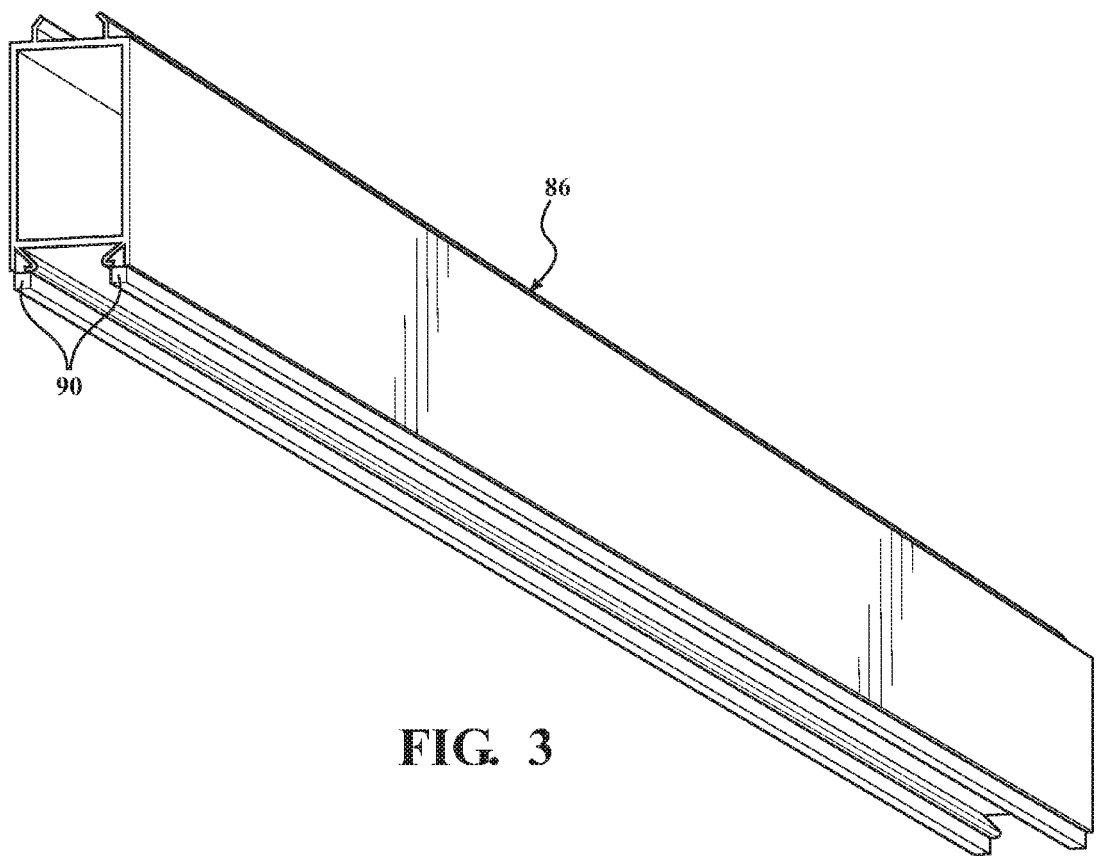
FIG. 3 is a perspective cut-away view of a stop log.

As best shown in FIG. 2, the first flood wall 30 may include a clamp 92 to exert a downward force on the stop logs 86 and to compress the second gaskets 90 to improve the watertight seal between adjacent ones of the stop logs 86 and between the bottom one of the stop logs 86 and the floor 26. The first flood wall 30 may include a third gasket 94 of elastomeric material extending vertically on the second vertical plate 60 within each of the troughs 62 to form a watertight seal between the stop logs 86 and the post 52. In FIG. 2, three bolts are shown on a brace 116 (however, this number is not limiting, and may be two as described in other portions of this application).

Figure 7:
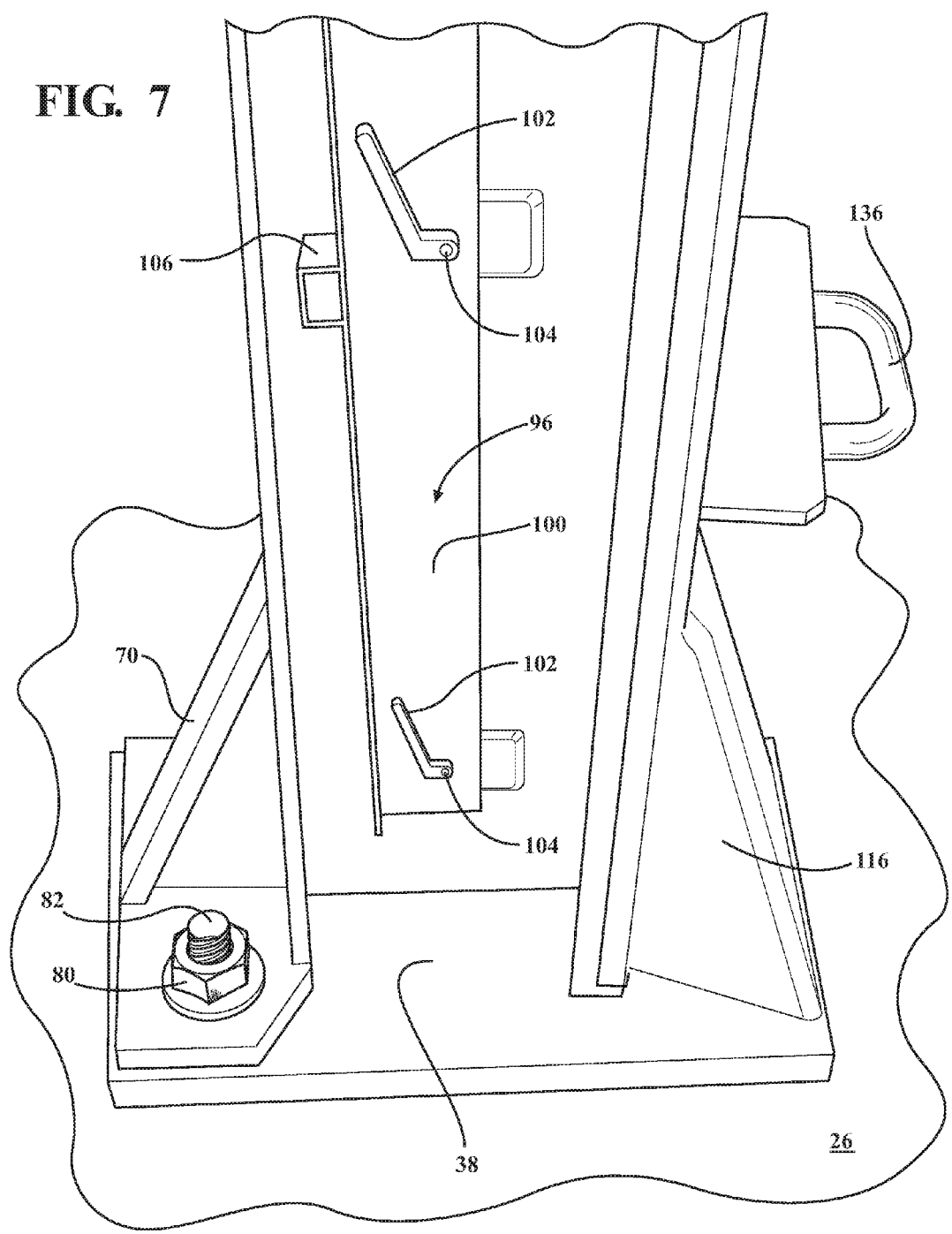
FIG. 7 is a perspective view of a post secured on an anchor plate.

As best shown in FIG. 7, the first flood wall 30 may include an angle bracket 96 disposed within each of the troughs 62 with a first portion 98 parallel to the vertical plates 58, 60 for biasing the stop logs 86 against the third gasket 94. A second portion 100 may be disposed adjacent and parallel to the intermediate plate 56 and may define an angled slot 102 with a fastener 104 therethrough to cause the angle bracket 96 to move toward second gasket 90 in response to application of a downward force to the angle bracket 96. A hollow protrusion 106 may extend from the first portion 98 opposite the third gasket 94 for application of the downward force and thereby sealing the stop logs 86 against the third gasket 94.

Figure 6:
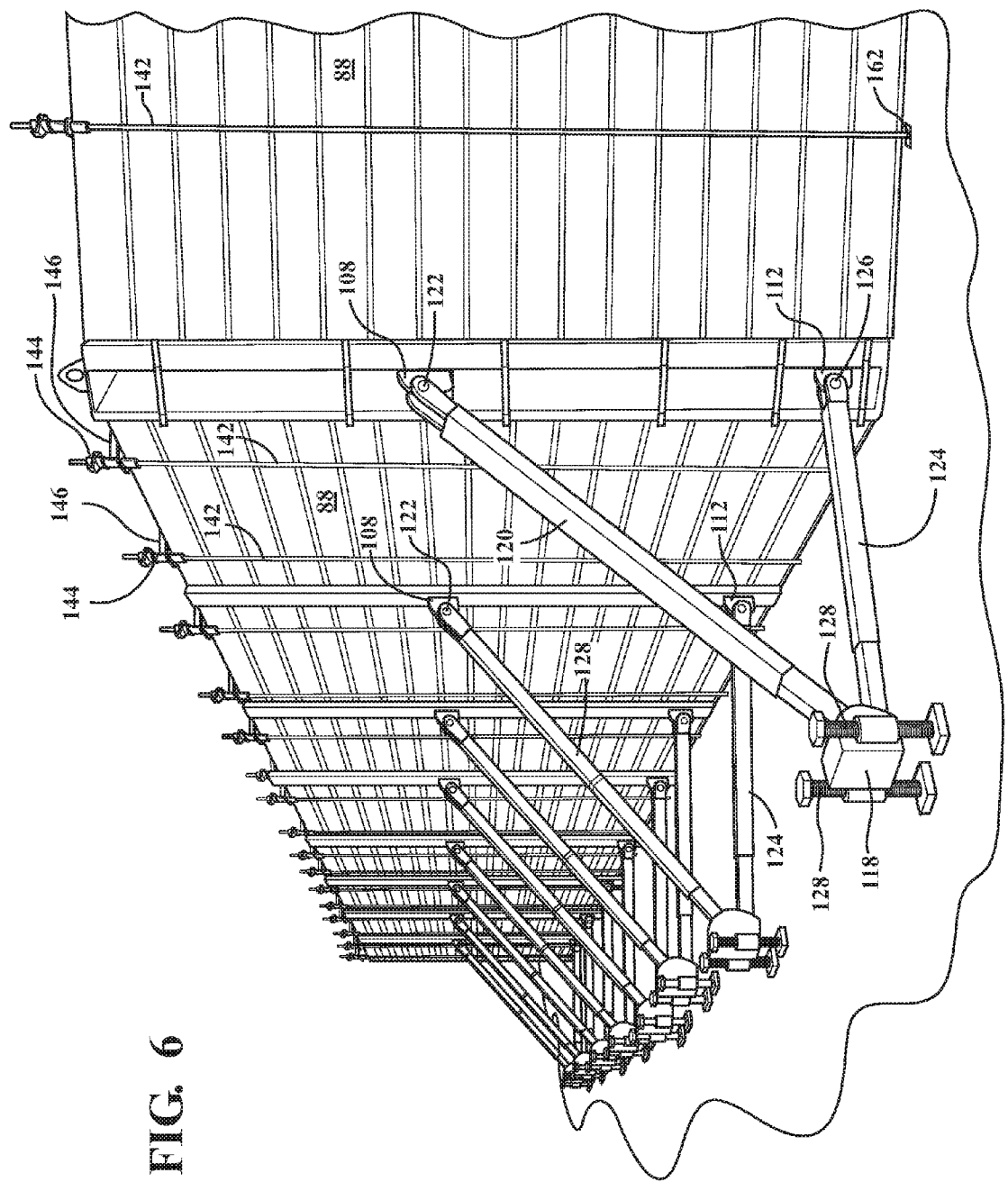
FIG. 6 is a side view of a flood barrier with a clamp that includes a threaded rod.

A brace 116 may attach to the post 52 to further support the post 52 against lateral forces from flood water. According to an aspect, and as shown in FIG. 6, the first flood wall 30 may include a first set of ears 108 extending outwardly from the second vertical plate 60 proximate to the lower edge 68 and spaced and parallel to one another and each defining a first round hole 110 (not shown) and a second set of ears 112 extending outwardly from the second vertical plate 60 spaced apart from the first set of ears 108 and spaced and parallel to one another and each defining a second round hole 114 (not shown). The brace 116 may have a generally triangular shape with a distal bracket 118 and a first member 120 connecting the distal bracket 118 to the first set of ears 108 with a first retaining pin 122 and a second member 124 connecting the distal bracket 118 to the second set of ears 112 with a second retaining pin 126 and a jack screw 128 for adjustably supporting the distal bracket 118 on the floor 26. According to an aspect, and as shown in FIG. 4, the brace 116 may extend from second vertical plate 60 and may be permanently affixed thereto. A hoisting loop 136 may extend outwardly from the beam portion 54 to aid in lifting and positioning the post 52 upright over the anchor plate 38.

As shown in FIG. 1, the double-wall flood barrier 20 also comprises a second flood wall 130 parallel and adjacent to the first flood wall 30 and having an identical construction and a mirror-image orientation to hold back water from a second wet side 132 opposite the first wet side 32. An anchor link 134 may be attached to the posts 52 opposite the base plates 66 and interconnecting adjacent ones of the posts 52 between the first flood wall 30 and the second flood wall 130 to transfer lateral loads from one of the posts 52 to the other adjacent one of the posts 52 and through to the brace 116 attached thereto and ultimately downwardly and outwardly to the floor 26.

Figure 5:
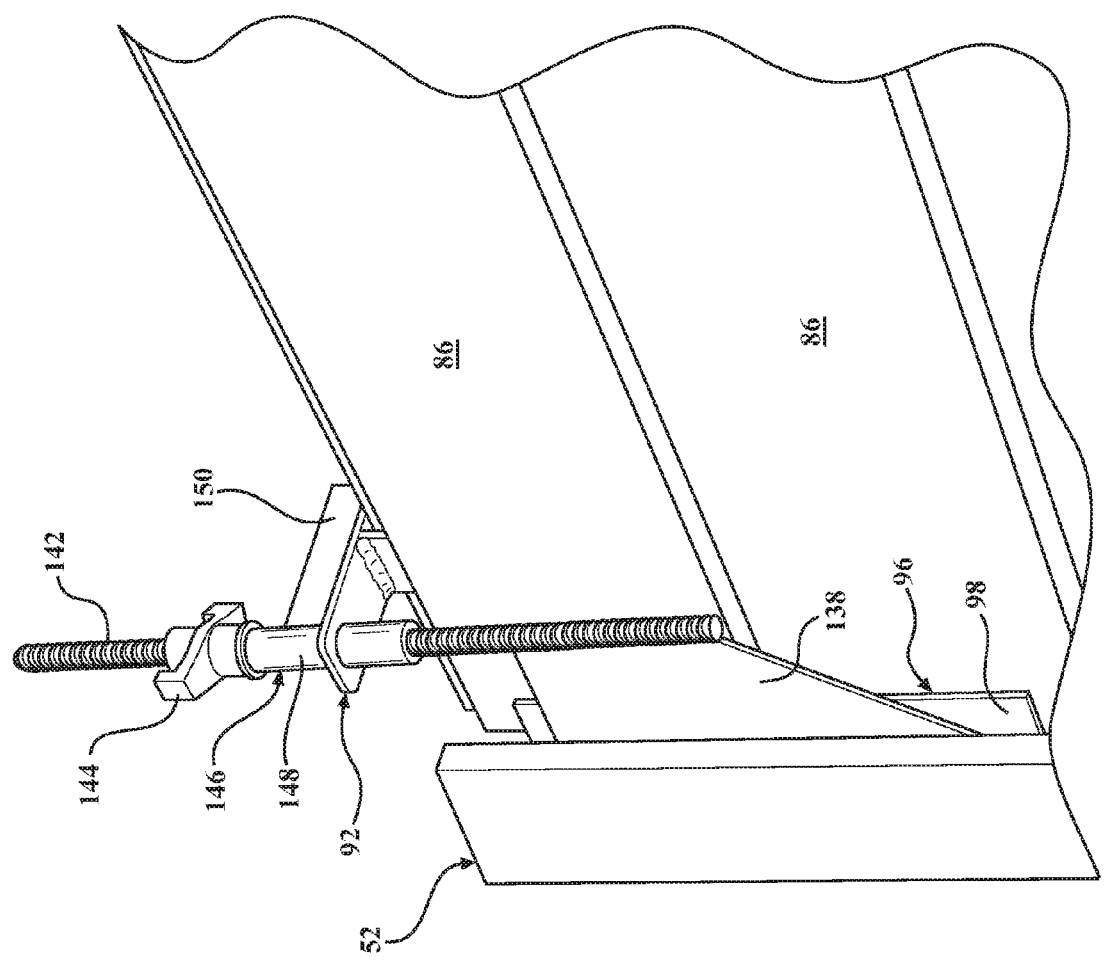
FIG. 5 is a perspective view of a flood barrier with a clamp that includes a panel extending generally vertically the post.

As best shown in FIG. 5, the clamp 92 may include a panel 138 having a trapezoidal shape and extending generally vertically from hooks 140 (not shown) that engage the post 52 to a threaded rod 142 and a wing nut 144 threaded thereon and a cross-member 146 with a sleeve portion 148 of cylindrical shape loosely surrounding the threaded rod 142 and an arm portion 150 to engage a top one of the stop logs 86 in the wall segment 88.

As best shown in FIG. 2, the clamp 92 may include a pressure plate 158 in a wedging engagement with the trough 62 and extending horizontally from the post 52 to a threaded hole 152 and a vice screw 154 threadedly engaging the threaded hole 152 and extending from a T-handle 156 to a free end contacting a pressure plate 158 to apply the downward force on a top one of the stop logs 86 in the wall segment 88.

As best shown in FIG. 6, the clamp 92 may include a threaded rod 142 extending from a T-shaped lug 160 (not shown), that allows threaded rod 140 adjustment to give a worker the ability to (by screwing the jackscrew up or down), to bring the wall into a vertical plumb. A cross-member 146 and a wing nut 144 identical to those shown on FIG. 5 may be disposed thereon to engage a top one of the stop logs 86 in the wall segment 88.

According to an aspect, adjacent ones of the posts 52 of the first flood wall 30 and the second flood wall 130 are each removably secured to the same anchor plate 38. In other words, a single anchor plate 38, which may be integrally formed, is configured to receive two adjacent posts 52, with one post 52 being part of each of the flood walls 30, 130. According to an aspect, the posts 52 may be removably securable to different anchor plates 38, which may be independently formed and configured to receive one and only one post 52. According to another aspect, a plurality of anchor plates 38 may be formed as a single assembly, which may form a portion of the first flood wall 30 and not the second flood wall 130. According to a further aspect, a plurality of anchor plates 38 may be formed as a single assembly, which may form a portion of both the first flood wall 30 and the second flood wall 130.

The present invention also provides a method for a double-wall flood barrier 20 on a floor (26) defining a flat surface (28) between a first jamb wall (22) and a second jamb wall (24).

The method includes the steps of providing a first flood wall to hold back water from a first wet side 32, which may include the sub-steps of insetting in the floor 26 an anchor plate 38 of the first flood wall 30 including a rectangular recess 48 with an aperture 50 therein; mounting a post 52 of the first flood wall 30 upright on the anchor plate 38 with a protrusion 72 of rectangular shape extending from a base plate 66 of the post 52 into the aperture 50; providing toggle bolts 76 of the first flood wall 30 between the anchor plate 38 and through bolt holes in the protrusion 72 with nuts 80 threaded thereon, moving the toggle bolts 76 of the first flood wall 30 between a first orientation to a second orientation to secure the toggle bolts 76 with the anchor plate 38; tightening the nut 80 on each of the toggle bolts 76 of the first flood wall 30 to hold the second orientation and to secure the post 52 to the anchor plate 38; stacking a plurality of stop logs 86 horizontally upon one another and between one of the posts 52 and another one of the posts 52 or one of the jamb walls 22, 24.

The method proceeds with steps for providing a second flood wall 130 parallel and adjacent and arranged in a mirror-image orientation to the first flood wall 30 and having an identical construction to hold back water from a second wet side 132 opposite the first wet side 32 by performing the steps as with providing the first flood wall 30.

The method may also include the step of interconnecting adjacent ones of the posts 52 with an anchor link 134 opposite the base plates 66 and between the first flood wall 30 and the second flood wall 130 to transfer lateral loads from one of the posts 52 to the other adjacent one of the posts 52, which may further transfer lateral loads through to a brace 116 attached thereto.

Obviously, many modifications and variations of the present invention are possible in light of the above teachings and may be practiced otherwise than as specifically described while within the scope of the appended claims. In addition, the reference numerals in the claims are merely for convenience and are not to be read in any way as limiting.

What is claimed is:

1. A double-wall flood barrier (20) mounted on a floor (26) and comprising:
    a first flood wall (30) to hold back water from a first wet side (32) and including an anchor plate (38) inset in the floor (26);
    the first flood wall (30) including a post (52) having a beam portion (54) defining a trough (62) extending vertically and a lower edge (68) with a base plate (66) attached thereto and removable securable to the anchor plate (38);
    the first flood wall (30) including a plurality of stop logs (86) stacked upon one another and each partially disposed within the trough (62) to seal against flood water from the first wet side (32); and
    a second flood wall (130) being parallel and adjacent and arranged in a mirror-image orientation to the first flood wall (30) to hold back water from a second wet side (132) opposite the first wet side (32) and including a post (52) adjacent the post (52) of the first flood wall (30) as adjacent ones of the posts (52);
    an anchor link (134) interconnecting the adjacent ones of the posts (52) between the first flood wall (30) and the second flood wall (130) to transfer lateral loads from one of the posts (52) to the other adjacent one of the posts (52); and
    wherein the anchor link (134) is attached only to an upper end of each of the posts (52) opposite the base plates (66).

2. The double-wall flood barrier (20) of claim 1 further including a brace (116) extending outwardly from the post (52) for supporting the post (52) against lateral forces from flood water.

3. The double-wall flood barrier (20) of claim 1 wherein adjacent ones of the posts (52) of the first flood wall (30) and the second flood wall (130) are each removably secured to the same anchor plate (38).

4. The double-wall flood barrier (20) of claim 1 wherein adjacent ones of the posts (52) of the first flood wall (30) and the second flood wall (130) are each removably secured to different anchor plates (38).

5. A method of constructing a double-wall flood barrier (20) comprising:
    providing a floor (26) defining a flat surface (28);
    providing a first flood wall (30) to hold back water from a first wet side (32) including the steps of insetting in the floor (26) an anchor plate (38) of a first flood wall (30), mounting a post (52) of the first flood wall (30) upright on the anchor plate (38), tightening a fastener (104) to secure the post (52) of the first flood wall (30) to the anchor plate (38), stacking a plurality of stop logs (86) horizontally upon one another and partially within one of the posts (52); and
    providing a second flood wall (130) parallel and adjacent and arranged in a mirror-image orientation to the first flood wall (30) and having an identical construction including a post (52) of the second flood wall (130) adjacent the post (52) of the first flood all (30) as adjacent ones of the posts (52) to hold hack water from a second wet side (132) opposite the first wet side (32) by performing the steps as with providing the first flood wall (30); and
    interconnecting the adjacent ones of the posts (52) with an anchor link (134) between only an upper end of each of the adjacent ones of posts (52) opposite the anchor plate (38) to transfer lateral loads from one of the posts (52) to the other adjacent one of the posts (52).

* * * * *